3,390,058
PLURAL STAGE PRESSURE DISTILLATION OF UREA SYNTHESIS EFFLUENT WITH LIQUIFIED GAS ADDITION
Eiji Otsuka and Kazumichi Kanai, Fujisawa, and Sadashi Chikaoka, Yokohama, Japan, assignors to Toyo Koatsu Industries, Incorporated, Tokyo, Japan, a corporation of Japan
Filed June 1, 1965, Ser. No. 460,386
Claims priority, application Japan, June 8, 1964, 39/32,219
8 Claims. (Cl. 203—49)

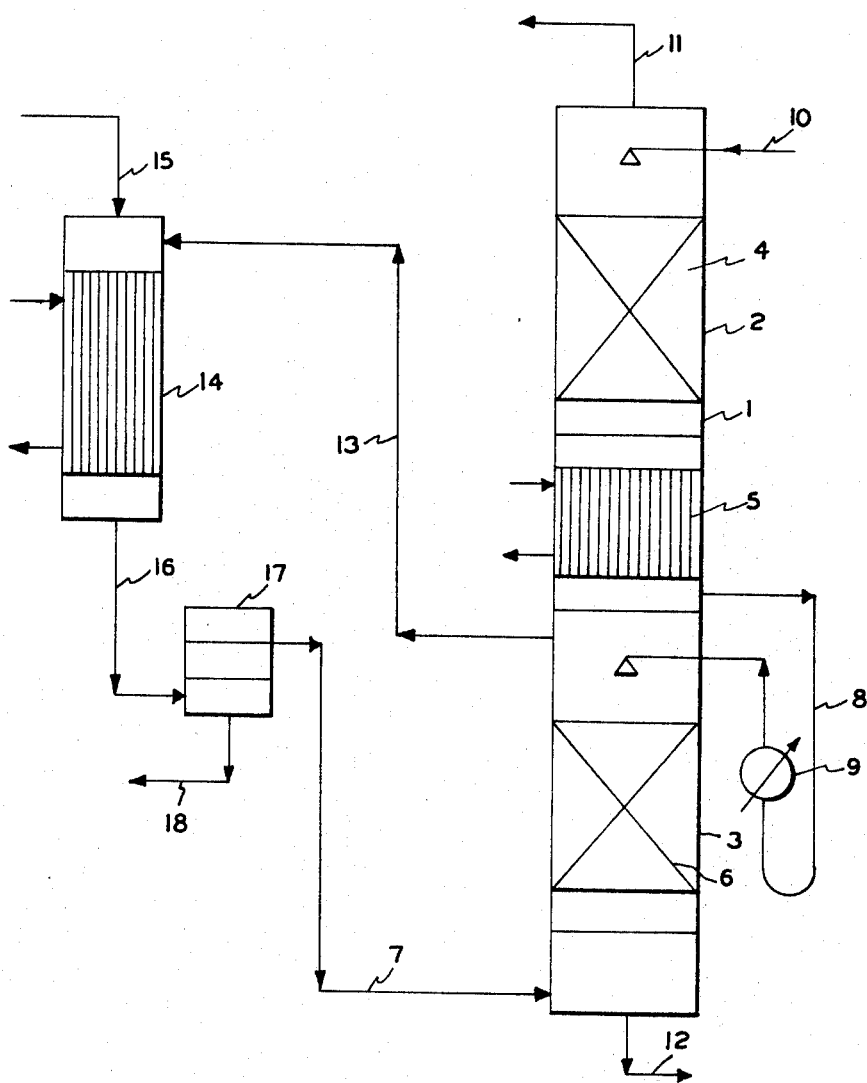

ABSTRACT OF THE DISCLOSURE

A method for separating unreacted carbon dioxide and ammonia from a urea synthesis effluent wherein the urea synthesis effluent is subjected to a first distillation at 10 to 30 kg./cm.$^2$ to remove major parts of the unreacted carbon dioxide and ammonia, and the resulting depleted solution is subjected to a second distillation at 10 to 30 kg./cm.$^2$ to remove the remaining parts of the unreacted carbon dioxide and ammonia, said second distillation being conducted by introducing into said depleted solution a liquefied gas such as propane.

---

This invention relates to a method of treating a urea synthesis effluent obtained by reacting ammonia with carbon dioxide at a urea synthesizing pressure and temperature to form urea.

A method widely used today to separate unreacted ammonia and carbon dioxide from a urea synthesis effluent is the two-stage distillation at high and then low pressures. Usually the unreacted ammonia and carbon dioxide from the high pressure distillation is absorbed in an absorbent at a pressure substantially equal to the distillation pressure and the resulting absorbate is recirculated to the urea synthesis. Therefore, the pressure of the high pressure distillation is selected to be in the range of 10 to 30 kg./cm.$^2$ in order to maintain a high concentration of unreacted ammonia and carbon dioxide in the absorbate in the high pressure absorption. However, it is impossible at this pressure to distill out all the unreacted ammonia and carbon dioxide from the urea synthesis effluent and, in order to more completely distill off the unreacted ammonia and carbon dioxide not distilled off in the high pressure distillation, the second-stage distillation is further carried out under pressure in the range of normal pressure to 5 kg./cm.$^2$. Such multi-stage separation is adopted because it is impossible from the standpoint of the equilibrium between the gas phase and liquid phase in urea synthesis effluents to completely distill off the unreacted ammonia and carbon dioxide from the urea synthesis effluent in one stage.

However, in a high pressure distillation, if the partial pressures of ammonia and carbon dioxide in the gas phase are reduced by passing an inert gas such as nitrogen through the distillation column, it is possible even at 10 to 30 kg./cm.$^2$ to distill off substantially all of the unreacted ammonia and carbon dioxide from the urea synthesis effluent. For example, in Japanese patent publication No. 5,269/1963, there is mentioned a method of distilling unreacted ammonia and carbon dioxide from a urea synthesis effluent while passing an inert gas, such as nitrogen, which is essentially non-condensable except under extreme conditions of very low temperatures and/or very high pressures, through the distillation column. It is possible by this method to separate substantially all the unreacted ammonia and carbon dioxide from a urea synthesis effluent under a high pressure. However, in this method, it is necessary to circulate a large amount of the inert gas by means of a blower or a compressor and, due to the presence of the inert, "noncondensable" gas, heat transfer is so low that the condensation of ammonia and carbon dioxide contained in the inert, "noncondensable" gas cannot be carried out efficiently.

An object of the present invention is to provide an improved method of separating substantially all the unreacted substances from a urea synthesis effluent under high pressure.

According to the present invention the urea synthesis effluent produced by reacting carbon dioxide with ammonia at high temperature and pressure (e.g., 150 to 220° C. at 150 to 400 atmospheres) in a urea synthesis zone is subjected to a high pressure distillation to separate unreacted ammonia and carbon dioxide. In the high pressure distillation an inert liquefiable gas in liquefied form is fed to the distillation zone so that the liquefied inert liquefiable gas is gasified in said zone and the unreacted ammonia and carbon dioxide is stripped in gaseous form from the effluent. A gaseous mixture comprising the inert liquefiable gas in gasified form and gaseous ammonia and carbon dioxide from the high pressure distillation is then introduced into the high pressure absorbing (condensing) zone and is condensed whereby the condensed gaseous mixture separates into two liquid phases, viz. a layer of the inert liquefiable gas in liquefied form and a layer of an aqueous solution containing unreacted ammonia and carbon dioxide. The layer of the inert liquefiable gas in liquefied form is recirculated into the high pressure distillation for use in the separation of the unreacted ammonia and carbon dioxide. The layer comprising the aqueous solution containing unreacted ammonia and carbon dioxide is recirculated to the urea synthesis zone for use in synthesizing urea.

It is necessary that the inert liquefiable gas used in the present invention (1) have a vapor pressure higher than the distillation pressure at the distillation temperature in high pressure distillation; (2) have a vapor pressure lower than the distillation pressure at the temperature used in condensing the inert liquefiable gas; (3) be substantially inert to the system of $NH_3$—$CO_2H_2O$-urea, the system of $NH_3$—$CO_2$—$H_2O$ and the system of urea-$H_2O$; and (4) be low in solubility in the above systems. In the present invention, the high pressure distillation is carried out preferably at a temperature of about 100 to 160° C. and a pressure of about 10 to 30 kg./cm.$^2$ and the condensation of the gaseous mixture of the inert liquefiable gas and the unreacted ammonia and carbon dioxide from the high pressure distillation can be carried out at the distilling pressure. Therefore, an inert liquefiable gas is selected to have a pressure which is higher than the distilling pressure at the distilling temperature of about 100 to 160° C. and is lower than the distilling pressure at the condensing temperature, for example, about 20 to 80° C. Needless to say, since the urea synthesis effluent and the inert liquefiable gas, and the aqueous solution of the unreacted ammonia and carbon dioxide and the inert liquefiable gas respectively coexist in the distillation column and condenser, the partial pressures of ammonia, carbon dioxide and water should also be considered. Therefore, such partial pressures are deducted from the total pressure to provide the "distilling pressure" referred to above, on which is based the vapor pressure standards for the inert liquefiable gas.

Examples of suitable inert liquefiable gases are (1) saturated or unsaturated hydrocarbons having 3 to 4 carbon atoms, i.e., propane, propylene, n-butane, iso-butane, 2-methyl propane, butene-1, butene-2 and iso-butylene, (2) Freon selected from F–11 ($CCl_3F$), F–12 ($CCl_2F_2$), F–21 ($CHCl_2F$), F–22 ($CHClF_2$) and F–114 ($C_2Cl_2F_4$), (3) alkyl chlorides having 1 to 2 carbon atoms, i.e., methyl chloride and ethyl chloride and (4) methyl amine selected from monomethyl amine, dimethyl amine and trimethyl amine. Any one of them or a mixture of two or more of them can be used. Among these inert liquefiable gases, propane is most preferable from the viewpoint of the boiling point, the heat of vaporization and the solubility in the $NH_3$—$CO_2$—$H_2O$-urea system and aqueous urea solution. In this case propylene can also contain propylene.

It is economically important in working the present invention to use the smallest possible number of mols of inert liquefiable gas per mol of the unreacted ammonia and carbon dioxide. For this purpose, it is important to make the ratio of the total number of mols of unreacted ammonia and carbon dioxide to the number of mols of the liquefiable gas as large as possible.

In accomplishing this, it is effective not only to improve the contact of the urea synthesis effluent with the inert liquefiable gas in the distilling column but also to maintain the temperature of the urea synthesis effluent fed to the top of the tower above about 160° C.

Usually it is preferable to use 0.2 to 2 mols, specifically 0.2 to 0.5 mol of the inert liquefiable gas per mol of the unreacted ammonia and carbon dioxide in the present invention.

It is desirable but not necessary to distill off about 70 to 90% of the unreacted ammonia and carbon dioxide by a conventional high pressure distillation, for example, at a pressure of 10 to 30 kg./cm.$^2$ and a temperature of 130 to 160° C. before distilling the unreacted ammonia and carbon dioxide from the urea synthesis effluent by the method of the present invention.

The present invention shall now be explained diagrammatically with reference to the accompanying diagrammatic drawing. Reference number 1 designates a high pressure distillation column having a first distillation zone 2 and a second distillation zone 3 which are independent of each other. The first distillation zone 2 has a packed zone 4 (which may be shelves or may be omitted in some cases) in the upper part thereof and a heater 5 in the bottom part thereof. The second distillation zone 3 has a packed zone 6 (which may be shelves) in the lower part thereof and a conduit pipe 7 for feeding an inert liquefiable gas to the bottom part. Reference number 8 designates a U-tube for leading urea synthesis effluent from the bottom part of the first distillation zone 2 to the top part of the second distillation zone 3. A preheater 9 is provided for heating the urea synthesis effluent fed into the second distillation zone 3. In the drawing, there is shown the high pressure distilling column having two distilling zones 2 and 3; however, the first distillation zone and the second distillation zone may be two independent high pressure distilling columns, if desired. Furthermore, the high pressure distillation column can be a single distillation column having only the function of the second distillation zone 3.

A urea synthesis effluent from a urea synthesis autoclave (not shown), the effluent having its pressure reduced to about 10 to 30 kg./cm.$^2$ (by gauge), is fed to the top part of the first distillation zone 2 through pipe 10. About 70 to 90% of the unreacted ammonia and carbon dioxide is distilled off at a bottom temperature of about 130 to 160° C. in zone 2.

The unreacted ammonia and carbon dioxide distilled off are fed to a high pressure absorber (not shown) through pipe 11. The urea synthesis effluent, from which large amounts of unreacted ammonia and carbon dioxide have been distilled off in the first distillation zone 2, enters the preheater 9 through the U-tube 8, is preheated there to above about 160° C. and then is led into the top part of the second distillation zone 3. In the packed zone 6 of the second distillation zone 3 the urea synthesis effluent is contacted with an inert liquefiable gas which is introduced into the bottom part of second zone 3 in the liquid state through pipe 7 and is gasified there.

The bottom temperature of the second distillation zone 3 is maintained at about 100 to 130° C. A urea solution from which all the unreacted ammonia and carbon dioxide have been separated is removed from second zone 3 and fed to a concentrating step through pipe 12. The gaseous mixture of inert liquefiable gas and unreacted ammonia and carbon dioxide separated from the urea synthesis effluent is fed to a condenser 14 through pipe 13 and is water-cooled there and condensed. In this case, an absorbent which dissolves ammonia and carbon dioxide, such as water, an aqueous urea solution or aqueous ammonia solution, can be sprayed into the condenser 14 through pipe 15, so that the gaseous mixture is more efficiently condensed. The liquid mixture obtained by condensing the gaseous mixture in the condenser 14 is fed to a decanter 17 through pipe 16 and is separated there into a layer of inert liquefiable gas and a layer comprising an aqueous solution of unreacted ammonia and carbon dioxide. The layer comprising the aqueous solution of unreacted ammonia and carbon dioxide is discharged through pipe 18, is compressed to the urea synthesizing pressure as it is, or after it has absorbed the unreacted ammonia and carbon dioxide distilled off in zone 2 through pipe 11, and then is fed into the urea synthesis autoclave or reactor. On the other hand, the liquid liquefiable gas layer separated in decanter 17 is fed into the bottom of the second distillation zone 3 through the pipe 7.

According to the method of the present invention, the unreacted ammonia and carbon dioxide can be completely distilled out of the urea synthesis effluent by high pressure distillation and no blower is required for circulating an inert "non-condensable" gas through a distillation column as is required in high pressure distillation using an inert non-condensable gas. Since the unreacted ammonia and carbon dioxide are carried by a liquefiable gas, they can be efficiently condensed.

The following example illustrates the invention but is not to be construed as limiting.

EXAMPLE

A urea synthesis effluent comprising 210.0 kg./hr. of urea, 270.0 kg./hr. of $NH_3$, 99.0 kg./hr. of $CO_2$ and 140.0 kg./hr. of $H_2O$ was fed from a synthesis autoclave in a urea plant to the top of the first distillation zone 2 of high pressure distillation column 1 in a test plant. The effluent flowed down a packed zone 4 in the first zone 2 and was heated by a steam heater 5 to be at a temperature of 155° C. The pressure was kept at 17 kg./cm.$^2$ (by gauge). A gaseous mixture comprising 240.0 kg./hr. of $NH_3$, 88.0 kg./hr. of $CO_2$ and 24.0 kg./hr. of $H_2O$ was obtained from the top of the first zone 2 and was fed via pipe 11 to a high pressure absorbing column in the urea plant. The liquid effluent comprising 210.0 kg./hr. of urea, 30.0 kg./hr. of $NH_3$, 11.0 kg./hr. of $CO_2$ and 116.0 kg./hr. of $H_2O$ from the first distillation zone was introduced through U-tube 8 into steam preheater 9 wherein it was heated to 160° C. and was fed to the top of the second zone 3 of the high pressure distillation column 1. On the other hand, 80.0 kg./hr. of liquid propane separated by decanter 17 was fed to the bottom of the second zone 3 through pipe 7.

The liquid propane evaporated at once. The propane vapor countercurrently contacted the urea synthesis effluent in the packed zone 6 and expelled unreacted ammonia and carbon dioxide from the effluent.

A urea solution comprising 210.0 kg./hr. of urea, 2.5 kg./hr. of $NH_3$, 1.0 kg./hr. of $CO_2$ and 107.5 kg./hr. of $H_2O$ at a temperature of 110° C. was removed from the bottom of the second distillation zone 3 through pipe 12. A gaseous mixture comprising 27.5 kg./hr. of $NH_3$, 10.0 kg./hr. of $CO_2$, 8.5 kg./hr. of $H_2O$ and 30.0 kg./hr. of propane was withdrawn from the top of the second zone 3, and was fed to a condenser 14 where it was cooled to 40° C. with water. At the same time, in order to help the condensation, 52.0 kg./hr. of water were sprayed into the gaseous mixture in condenser 14. The gaseous mixture completely liquefied in condenser 14.

The resulting condensate was led to the decanter 17 and was separated into liquid propane in an upper layer and an aqueous solution in a lower layer. The lower layer was returned to the high pressure absorber in the urea plant. The propane in the upper layer was continuously fed through pipe 7 to the bottom of the second distilling zone by gravity head.

What is claimed is:

1. In a method for separating unreacted carbon dioxide and ammonia from a urea synthesis effluent containing the same, water and urea wherein said effluent is subjected to a high pressure distillation to remove ammonia and carbon dioxide in a gaseous mixture from said effluent and thereafter subjecting said gaseous mixture to high pressure condensation to recover said ammonia and carbon dioxide, that improvement comprising, subjecting said effluent to a first distillation at a gauge pressure of 10–30 kg./cm.$^2$ and a temperature of 130 to 160° C. to remove major parts of said unreacted carbon dioxide and ammonia, subjecting the depleted solution from said first distillation to a second distillation at a gauge pressure of 10–30 kg./cm.$^2$ and a temperature of 100 to 160° C. to remove the remaining parts of said unreacted carbon dioxide and ammonia, said second distillation being conducted by introducing into said depleted solution a liquefied gas having a vapor pressure higher than the pressure of said second distillation at the temperature of said second distillation but lower than the pressure of said high pressure condensation at the temperature of said condensation, said gas being substantially inert to and of low solubility in ammonia, carbon dioxide, water, urea and mixtures thereof under the conditions of said distillation and condensation whereby said liquefied gas is gasified to form a gaseous mixture with the remaining parts of said unreacted carbon dioxide and ammonia; and thereafter subjecting said gaseous mixture to said high pressure condensation at a gauge pressure of 10–30 kg./cm.$^2$ and a temperature of 20 to 80° C. to recover said ammonia, carbon dioxide and liquefiable gas in liquid form.

2. The improvement claimed in claim 1 wherein said high pressure condensation forms a liquid mixture of said gas, carbon dioxide and ammonia, and wherein said gas is separated from said liquid mixture and returned to said second distillation.

3. The improvement claimed in claim 2 wherein said liquid mixture is allowed to form a layer comprising said gas and a layer containing said ammonia and carbon dioxide and wherein said gas in liquid form is separated from said ammonia and carbon dioxide.

4. Improvement claimed in claim 1 wherein said gas is propane.

5. Improvement claimed in claim 2 wherein said gas is propane.

6. Improvement claimed in claim 1 wherein an amount in the range of 0.2 to 2 mols of said gas per mol of carbon dioxide and ammonia is employed.

7. Improvement claimed in claim 1 wherein an aqueous liquid is directly contacted with said gaseous mixture during said high pressure condensation to assist said condensation.

8. Improvement claimed in claim 2 wherein an aqueous liquid is directly contacted with said gaseous mixture during said condensation to assist said condensation.

References Cited

UNITED STATES PATENTS

| | | | |
|---|---|---|---|
| 2,046,827 | 7/1936 | Lawrence et al. | 260—555 |
| 2,371,860 | 3/1945 | Walls et al. | 203—49 |
| 2,533,992 | 12/1950 | Brunjes | 202—185.2 |
| 2,894,878 | 7/1959 | Cook | 203—50 |
| 3,114,681 | 12/1963 | Biekart et al. | 203—50 |

FOREIGN PATENTS 144,842   4/1962   U.S.S.R.

WILBUR L. BASCOMB, Jr., *Primary Examiner.*